J. Jochum,

Tackle Block.

No 2,020. Reissued July 4, 1865.

Witnesses,
James P. Hall
Thos P. McNamara

Inventor,
John Jochum

UNITED STATES PATENT OFFICE.

JOHN JOCHUM, OF BROOKLYN, NEW YORK.

IMPROVED SELF-ACTING PULLEY-BRAKE.

Specification forming part of Letters Patent No. 45,248, dated November 29, 1864; Reissue No. 2,020, dated July 4, 1865.

*To all whom it may concern:*

Be it known that I, JOHN JOCHUM, of Brooklyn, in the county of Kings and State of New York, have invented a new and Improved Self-Acting Pulley-Brake; and I do hereby declare that the following is a full, clear, and exact description thereof, which will enable others skilled in the art to make and use the same, reference being had to the accompanying drawings, forming part of this specification, in which—

Figure 1:
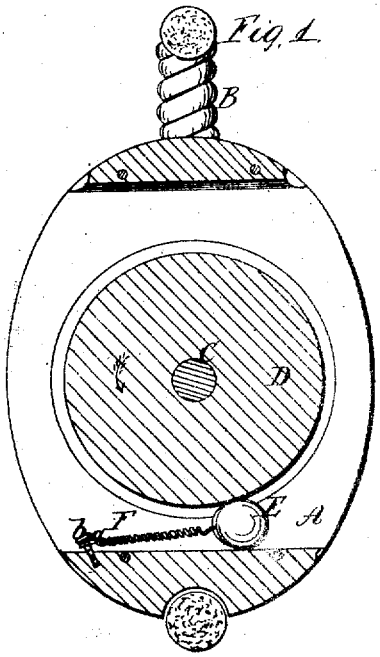
Figure 2:
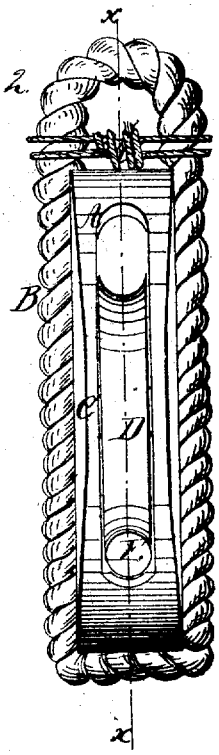
Figure 3:
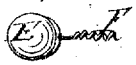

Figure 1 represents a longitudinal vertical section of my invention, the line *x x*, Fig. 2, indicating the plane of section. Fig. 2 is an end elevation of the same. Fig. 3 is a detached view of the brake.

Similar letters of reference indicate like parts.

This invention consists in combining with an ordinary tackle-block a spherical brake-shoe attached to a spring and applied between the sheave or sheaves, and the shell of a block containing one or more sheaves in such a manner that the said sheave or sheaves are allowed to turn freely in one direction but prevented from revolving in the opposite direction, and that a tackle-block is obtained of a convenience much superior to that of the ordinary tackle-block in hoisting, shortening sail, and other similar operations with a trifling increase in the cost of the block.

A represents the shell of a tackle-block, which is made of wood or any other suitable material in the usual manner. This block forms the bearings for the axle C of the sheave D, and it is provided with a strap, B, made of a piece of rope or of metal. The sheave is grooved to form a secure guide for the rope passing over it, all as usual.

My brake attachment consists of a spherical wedge, E, which is secured to a spring, F, and placed between the circumference of the sheave and the shell of the block, as clearly shown in the drawings. If the shell contains two or more sheaves a separate wedge may be applied to each sheave, or one and the same wedge may be used for different sheaves. The spring F is so adjusted that it pulls the wedge E gently between the sheave and the shell, and it is fastened to said shell by means of a hook, *a*, catching round a screw, *b*, or other suitable fastening, so that it can be easily unhooked whenever it may be desirable to remove the brake.

If the sheave rotates in the direction of the arrow marked on it in Fig. 1, the wedge is pushed out and the motion of the sheave takes place with an imperceptible obstruction; but if an attempt is made to turn the sheave in the direction opposite to the arrow marked on it, the wedge is drawn in between its circumference and the shell and the sheave is not allowed to move.

The great advantage of this arrangement for tackle-blocks is apparent. In hoisting a heavy weight with an ordinary tackle-block half the labor consists in holding onto the rope until a fresh hold can be taken, and if two men should be perfectly able to raise the weight, at least one but generally two other men are needed to accomplish the operation of hoisting. By the use of my tackle-block this extra number of men can be dispensed with. If two men are able to raise a weight, they can also hoist it readily, because the weight once raised is not allowed to fall back except if the rope is permitted to slide over the sheave.

In lowering a weight my tackle-block has also great advantages. The sheave, not being allowed to turn back causes the rope to glide over its circumference, and one man is enabled to lower a comparatively heavy weight with little exertion. This tackle-block is of particular advantage on board of vessels for all operations connected with raising or lowering the sails and for any other hoisting operation.

I am well aware that a spherical brake is in use on sewing-machines to prevent the main shaft of the same being turned in the wrong direction, but the application of such a brake to a tackle-block requires a special contrivance to adapt it to act with promptness and effect in all positions of the block.

I do not claim, broadly, the use of a ball as a brake for pulleys; but

I claim as new and desire to secure by Letters Patent—

A tackle-block containing one or more sheaves and provided with one or more spherical wedges, E, and springs F, constructed and operating substantially as and for the purposes set forth.

JOHN JOCHUM.

Witnesses:
M. M. LIVINGSTON,
C. L. E. TOPLIFF.